US012699796B2

(12) United States Patent
Acharya Chandrashekar et al.

(10) Patent No.: US 12,699,796 B2
(45) Date of Patent: Aug. 4, 2026

(54) SELECTIVELY MASKING VIRTUAL ASSETS IN VIRTUAL ENVIRONMENTS

(71) Applicant: INTERNATIONAL BUSINESS MACHINES CORPORATION, Armonk, NY (US)

(72) Inventors: Charan Acharya Chandrashekar, Bangalore (IN); Raja Rahul, Visakhapatnam (IN)

( * ) Notice: Subject to any disclaimer, the term of this patent is extended or adjusted under 35 U.S.C. 154(b) by 55 days.

(21) Appl. No.: 18/886,094

(22) Filed: Sep. 16, 2024

(65) Prior Publication Data

US 2026/0080080 A1     Mar. 19, 2026

(51) Int. Cl.
   *G06F 21/00*       (2013.01)
   *G06F 21/62*       (2013.01)

(52) U.S. Cl.
   CPC ................................. *G06F 21/6218* (2013.01)

(58) Field of Classification Search
   None
   See application file for complete search history.

(56) References Cited

U.S. PATENT DOCUMENTS

| | | | | | |
|---|---|---|---|---|---|
| 8,233,005 | B2 | | 7/2012 | Finn et al. | |
| 9,235,319 | B2 | | 1/2016 | Finn et al. | |
| 11,068,043 | B2 | | 7/2021 | Strong et al. | |
| 11,853,366 | B1 | * | 12/2023 | Bhushan | G06F 3/011 |
| 12,026,527 | B2 | * | 7/2024 | Blakeley | G06F 8/36 |
| 12,190,728 | B2 | * | 1/2025 | Williams | G08G 1/0967 |
| 12,229,622 | B1 | * | 2/2025 | Welch | G06T 19/006 |
| 12,354,500 | B1 | * | 7/2025 | Fieldman | G06T 11/00 |
| 12,367,638 | B1 | * | 7/2025 | Dehkordi | G06T 15/00 |
| 12,418,555 | B1 | * | 9/2025 | Skarphedinsson | G06N 20/00 |
| 12,450,336 | B2 | * | 10/2025 | Mathur | G06F 21/53 |
| 12,450,402 | B2 | * | 10/2025 | Mathur | G06T 5/70 |
| 2017/0300673 | A1 | * | 10/2017 | Thomas | G06F 21/316 |

(Continued)

FOREIGN PATENT DOCUMENTS

| | | |
|---|---|---|
| CN | 110603539 B | 9/2023 |
| KR | 102443946 B1 | 9/2022 |

OTHER PUBLICATIONS

"Beyond the hype." IBM, https://www.ibm.com/thought-leadership/institute-business-value/en-us/report/enterprise-metaverse, retrieved from website: Sep. 13, 2024.

(Continued)

*Primary Examiner* — Shin-Hon (Eric) Chen
(74) *Attorney, Agent, or Firm* — Seed Intellectual Property Law Group LLP

(57) ABSTRACT

Systems, methods, and computer program products for selectively masking virtual assets in a virtual environment are described herein. A method comprises receiving a request to present a field of view within a range of a virtual environment via a client computing platform associated with a user; identifying a virtual asset within the range; reading a set of viewing permissions associated with the virtual asset; determining the user is not permitted to view the virtual asset; providing contextual information for the virtual environment and asset information as input to a generative language model; reading an alternative representation of the field of view generated by the generative language model; and presenting the alternative representation to the user via the client computing platform.

16 Claims, 7 Drawing Sheets

200

(56) References Cited

U.S. PATENT DOCUMENTS

| | | | | |
|---|---|---|---|---|
| 2021/0306343 A1* | 9/2021 | Halun | .................... | H04L 63/104 |
| 2022/0214854 A1 | 7/2022 | Todasco | | |
| 2023/0043332 A1 | 2/2023 | Andon et al. | | |
| 2023/0162179 A1 | 5/2023 | Deng | | |
| 2023/0216682 A1 | 7/2023 | Lipton et al. | | |
| 2023/0244761 A1* | 8/2023 | Raffay | ..................... | G06F 21/64 |
| | | | | 726/28 |
| 2024/0078536 A1 | 3/2024 | Dashkov | | |
| 2024/0257474 A1* | 8/2024 | Maschmeyer | ......... | G06V 10/44 |
| 2024/0311546 A1* | 9/2024 | Maschmeyer | ........ | G06F 40/166 |
| 2025/0061193 A1* | 2/2025 | Singh | .................. | G06F 21/6218 |
| 2025/0086898 A1* | 3/2025 | Furtwangler | ........... | G06T 15/08 |
| 2025/0284825 A1* | 9/2025 | Strandborg | ........... | G06T 19/006 |

OTHER PUBLICATIONS

"Open Source Agent-Based Metaverse." Vircadia, https://vircadia.com/, retrieved from website: Sep. 13, 2024.

Anonymous, "A Method to Control the Visibility of 3D Virtual Objects." IP.com Prior Art Database, epub date: Apr. 4, 2023.

Anonymous, "Metaverse." Wikipedia, https://en.wikipedia.org/wiki/Metaverse, retrieved from website: Sep. 13, 2024.

Chijioke, "IBM Metaverse: The Future of Virtual Collaboration." Dipprofit, https://www.dipprofit.com/discover-ibm-metaverse/, Feb. 27, 2023.

Conley et al., "Qualcomm Continues to Bring the Generative AI Revolution to Devices and Empowers Developers with Qualcomm AI Hub." Qualcomm, https://www.qualcomm.com/news/releases/2024/02/qualcomm-continues-to-bring-the-generative-ai-revolution-to-devi, Feb. 26, 2024.

Gao et al., "GET3D: A Generative Model of High Quality 3D Textured Shapes Learned from Images." Advances In Neural Information Processing Systems 35 (2022): 31841-31854.

Griffith, "Space please! Facebook's metaverse creates 'personal bubble' around avatars after reports of rampant harassment and virtual groping." DailyMail, https://www.dailymail.co.uk/news/article-10479875/Facebooks-metaverse-creates-personal-bubble-avatars-reports-rampant-harassment.html , Feb. 5, 2022.

Krishnan, "Top metaverse cybersecurity challenges: How to address them." TechTarget, https://www.techtarget.com/searchsecurity/tip/Top-metaverse-cybersecurity-challenges-to-consider, Feb. 12, 2024.

Krishnan, "What are the security risks associated with the metaverse?" https://www.devopsschool.com/blog/what-are-the-security-risks-associated-with-the-metaverse/ DevOpsSchool, May 11, 2023.

Security Staff, "9 security threats in the metaverse." Security, https://www.securitymagazine.com/articles/98142-9-security-threats-in-the-metaverse, Aug. 10, 2022.

Yalalov et al., "7 Global Companies Building Up and Exploring the Metaverse." MPOST, https://mpost.io/7-global-companies-building-up-and-exploring-the-metaverse/, Sep. 22, 2022.

Wan et al., "3D-Mask-GAN: Unsupervised Single-View 3D Object Reconstruction", 2019 6th International Conference on Behavioral, Economic and Socio-Cultural Computing (BESC), Oct. 28-30, 2019, 6 pages.

Akshay Takyar "Generative AI: Use cases, applications, solutions and implementation", LeewayHertz, Feb. 11, 2026, 66 pages, https://www.leewayhertz.com/generative-ai-use-cases-and-applications/#How-generative-AI-works.

Basheer K.C. Sabreena, "Nextech3D.ai Develops Generative AI That Converts Text to 3D Models", May 10, 2023, 03 pages, https://www.analyticsvidhya.com/blog/2023/05/nextech3d-ai-develops-generative-ai-that-converts-text-to-3d-models/.

"Discover Viverse-3D Portal to Immersive Internet", Feb. 11, 2026, 05 pages, https://www.viverse.com/.

"The Sandbox Game—User-Generated Crypto & Blockchain Games", Feb. 11, 2026, 02 pages, https://www.sandbox.game/en/.

"Welcome to Decentraland", Feb. 11, 2026, 10 pages, https://decentraland.org/.

Yu et al., "Generative Image Inpainting with Contextual Attention", 2018, 10 pages, https://openaccess.thecvf.com/content_cvpr_2018/papers/Yu_Generative_Image_Inpainting_CVPR_2018_paper.pdf.

* cited by examiner

100

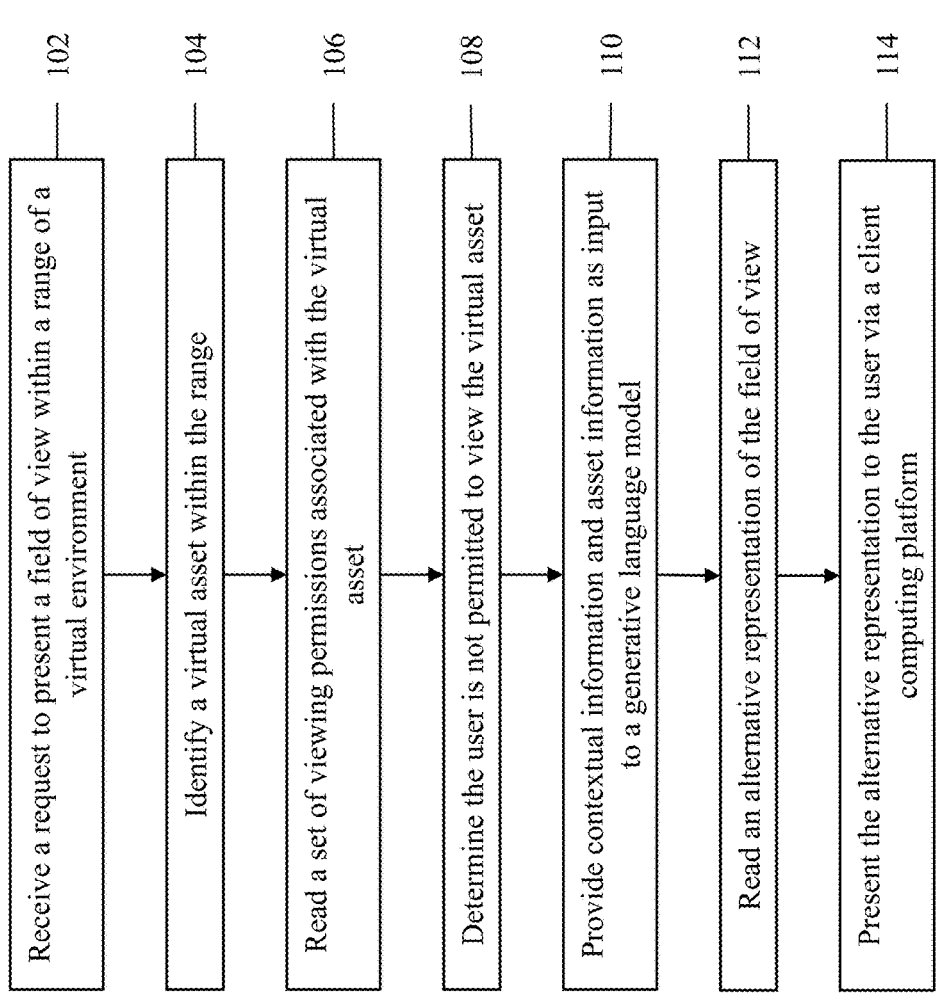

Receive a request to present a field of view within a range of a virtual environment — 102

Identify a virtual asset within the range — 104

Read a set of viewing permissions associated with the virtual asset — 106

Determine the user is not permitted to view the virtual asset — 108

Provide contextual information and asset information as input to a generative language model — 110

Read an alternative representation of the field of view — 112

Present the alternative representation to the user via a client computing platform — 114

FIG. 1

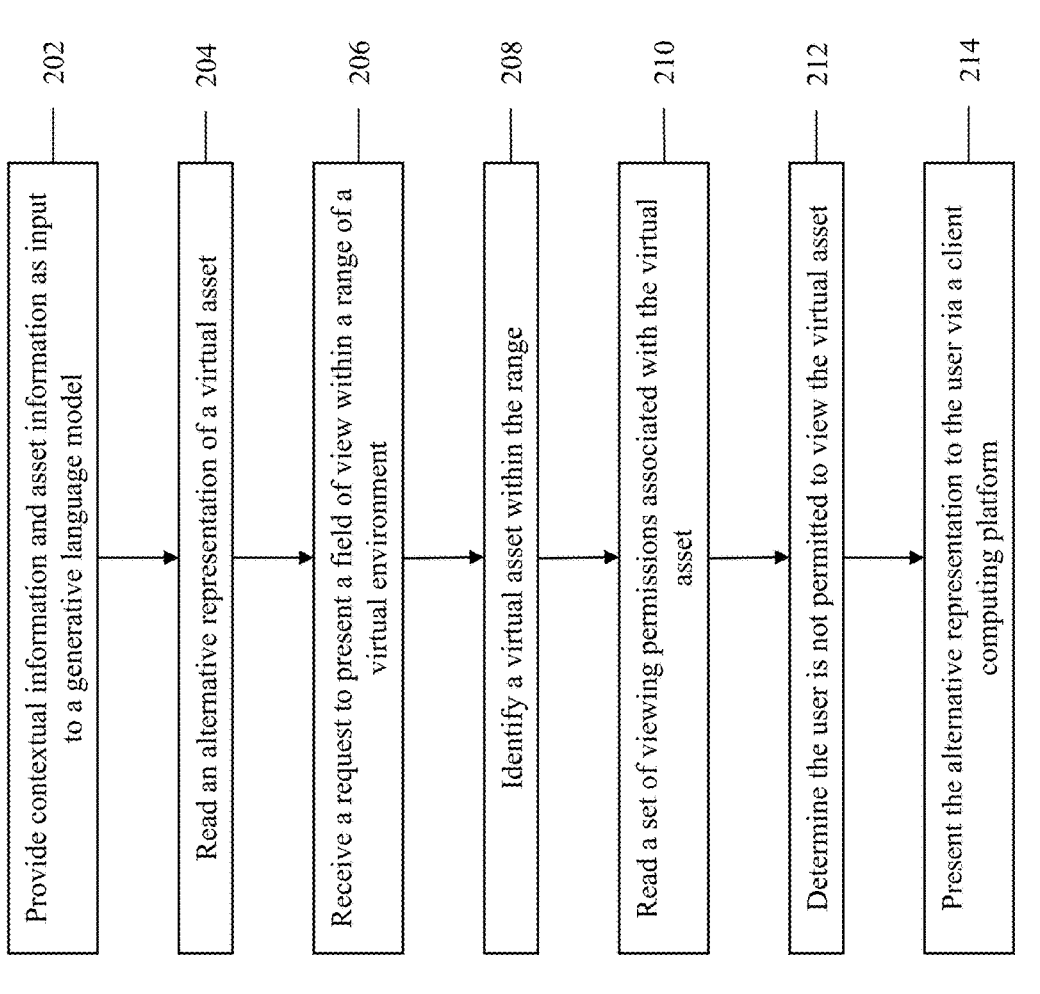

200

202 Provide contextual information and asset information as input to a generative language model 204 Read an alternative representation of a virtual asset 206 Receive a request to present a field of view within a range of a virtual environment 208 Identify a virtual asset within the range 210 Read a set of viewing permissions associated with the virtual asset 212 Determine the user is not permitted to view the virtual asset 214 Present the alternative representation to the user via a client computing platform

SELECTIVELY MASKING VIRTUAL ASSETS IN VIRTUAL ENVIRONMENTS

BACKGROUND

Embodiments of the present disclosure relate to selectively masking virtual assets in a virtual environment.

SUMMARY

According to embodiments of the present disclosure, methods of, computer program products for, and computer systems for selectively masking virtual assets in a virtual environment are disclosed. A method for selectively masking virtual assets in a virtual environment may comprise receiving a request to present a field of view within a range of a virtual environment. The presentation may be via a client computing platform associated with a user. The method may comprise identifying a virtual asset within the range. The method may comprise reading a set of viewing permissions associated with the virtual asset. The set of viewing permissions may comprise a set of one or more identifiers. The identifiers may identify one or more users permitted to view the virtual asset. The method may comprise determining the user is not permitted to view the virtual asset. The determination may be in accordance with the set of identifiers.

The method may comprise providing contextual information for the virtual environment and asset information as input to a generative language model. The contextual information may characterize a current state of the range of the virtual environment. The asset information may characterize the virtual asset. The method may comprise reading an alternative representation of the field of view generated by the generative language model. The alternative representation may be generated in accordance with the contextual information and the asset information. By way of non-limiting example, the alternative representation does not depict the virtual asset. The method may comprise presenting the alternative representation to the user via the client computing platform.

BRIEF DESCRIPTION OF THE DRAWINGS

FIG. 1 is a flow diagram depicting an exemplary method for selectively masking virtual assets in a virtual environment, in accordance with one or more embodiments of this disclosure.

FIG. 2 is a flow diagram depicting an exemplary method for selectively masking virtual assets in a virtual environment, in accordance with one or more embodiments of this disclosure.

DETAILED DESCRIPTION

Figure 3A:
FIGS. 3A, 3B, and 3C are representations of a virtual environment, in accordance with one or more embodiments of this disclosure.

Online platforms, including virtual environments, are vulnerable to cyberattacks. The virtual environments may include metaverse environments (e.g., metaverse games). Cyberattacks may be in the form of hacking, phishing scams, and/or ransomware attacks. A user's avatars and/or activities within the virtual environments may put the user at risk of being a target of a cyberattack. For example, virtual assets associated with the user, avatars, and/or activities within the virtual environment may reveal the user's real-world wealth or assets to threat actors. Current methods for protecting users of virtual environments include creating boundaries around avatars and creating private virtual environments. Both of these methods enables users to control who can go close to and interact with their avatars. However, current methods for protecting users still enable virtual assets to be visible to all avatars within viewing range of the virtual assets. Further, creating private virtual environments restricts users from interacting with people they otherwise would in a public virtual environment. As such, methods for selectively masking virtual assets in virtual environments are desired. Such methods enable users to use and/or display their virtual assets within the view of trusted others while selectively hiding their virtual assets from others.

FIG. 1 is a flowchart illustrating an exemplary method 100 for selectively masking virtual assets in a virtual environment according to one or more exemplary embodiments of the present disclosure. The operations of method 100 presented below are intended to be illustrative. In some implementations, method 100 is accomplished with one or more additional operations not described and/or without one or more of the operations discussed. Additionally, the order in which the operations of method 100 are illustrated in FIG. 1 and described below is not intended to be limiting.

In some implementations, method 100 is implemented in one or more processing devices (e.g., a digital processor, an analog processor, a digital circuit designed to process information, a state machine, and/or other mechanisms for electronically processing information). The one or more processing devices may include one or more devices configured through hardware, firmware, and/or software to be specifically designed for execution of one or more of the operations of method 100.

Operation 102 comprises receiving a request to present a field of view within a range of a virtual environment. In some implementations, the request is received responsive to a field of view of an avatar associated with the user changing. In some implementations, the request is received responsive to the avatar and/or the field of view of the avatar moving toward the virtual asset within the virtual environment. In some implementations, the request is received responsive to the virtual asset moving and/or being moved toward the avatar and/or the field of view of the avatar in the virtual environment. By way of non-limiting example, the request is received responsive to the virtual asset being located outside of the field of view but within a particular range of the field of view. The presentation may be via a client computing platform associated with a user. The client computing platform may be a virtual or augmented reality system. An instance of the virtual environment may be a three-dimensional virtual space accessible through the virtual reality (VR) or augmented reality system (AR).

The virtual environment may be a virtual space through which users can interact with the virtual environment and other users within the virtual environment. Users may interact with the virtual environment and/or other users through avatars. By way of non-limiting example, the virtual environment is a metaverse game. Each user may be associated with an account within the virtual environment. Each account may be associated with an inventory of the user, an avatar for the user, activity history of the user, chat history of the user, an identifier, and/or other information.

By way of non-limiting example, the identifier is a unique identifier for the account. For example, a user who has multiple accounts may be associated with multiple unique identifiers. The inventory of the user may comprise virtual assets owned by the user and accessible within the virtual environment. By way of non-limiting example, a virtual asset is a non-fungible token (NFT). Each virtual asset may comprise metadata characterizing permissions for the virtual asset. The user may set the permissions for each virtual asset of the inventory. Permissions for a virtual asset may comprise a set of identifiers for users permitted to view the virtual asset, a set of identifiers for users permitted to interact with the virtual asset, an alternative representation for the virtual asset, and/or other permissions. By way of non-limiting example, the user may identify permitted users by group (e.g., family, friends, colleagues) and/or individually. By way of non-limiting example, the metadata of a virtual asset comprises unique identifiers of permitted users. As such, a user with multiple accounts may only be permitted to view the virtual asset using particular permitted accounts. The activity history of the user may characterize activity of the user within the virtual environment. The chat history of the user may comprise messages sent to and/or messages sent by the user within the virtual environment.

It will be appreciated that a variety of virtual and augmented reality devices are known in the art. For example, various head-mounted displays providing either immersive video or video overlays are provided by various vendors. Some such devices integrate a smart phone within a headset, the smart phone providing computing and wireless communication resources for each virtual or augmented reality application. Some such devices connect via wired or wireless connection to an external computing node such as a personal computer. Yet other devices may include an integrated computing node, providing some or all of the computing and connectivity required for a given application.

Virtual or augmented reality displays may be coupled with a variety of motion sensors in order to track a user's motion within a virtual environment. Such motion tracking may be used to navigate within a virtual environment, to manipulate a user's avatar in the virtual environment, or to interact with other objects in the virtual environment. In some devices that integrate a smartphone, head tracking may be provided by sensors integrated in the smartphone, such as an orientation sensor, gyroscope, accelerometer, or geomagnetic field sensor. Sensors may be integrated in a headset, or may be held by a user, or attached to various body parts to provide detailed information on user positioning.

In some embodiments, cortical magnification is evaluated for a given location. Cortical magnification describes how many neurons in an area of the visual cortex are responsible for processing a stimulus of a given size, as a function of visual field location. In the center of the visual field, corresponding to the center of the fovea of the retina, a very large number of neurons process information from a small region of the visual field. If the same stimulus is seen in the periphery of the visual field (i.e., away from the center), it would be processed by a much smaller number of neurons. The reduction of the number of neurons per visual field area from foveal to peripheral representations is achieved in several steps along the visual pathway, starting already in the retina. Visual performance depends on the amount of cortical tissue devoted to the task. As an example, spatial resolution (i.e., visual acuity) is best in the center of the fovea and lowest in the far periphery.

By determining cortical magnification, the effective visual fidelity of an item may be determined based on the distance from a viewer's center of view. This corresponds to a viewer's likelihood of recognizing the object. In a VR environment, the center of a user's field of view is always known by virtue of their head being fixed in a headset. In some systems, eye tracking enables determination of a viewer's fovea gaze direction. Accordingly, cortical magnification may be determined in real time based on the current field of view. It will be appreciated that the above is applicable to virtual and augmented reality environments in general, including those that are presented without a headset. For example, a magic window implementation of VR or AR uses the display on a handheld device such as a phone as a window into a virtual space. By moving the handheld, by swiping, or by otherwise interacting with the handheld device, the user shifts the field of view of the screen within the virtual environment. A center of a user's field of view can be determined based on the orientation of the virtual window within the virtual space without the need for eye-tracking. However, in devices including eye-tracking, more precision may be obtained.

Operation 104 comprises identifying a virtual asset within the range. Identifying the virtual asset may comprise reading a set of virtual assets within the range. By way of non-limiting example, the operations described herein may be repeated for each virtual asset within the range.

Operation 106 comprises reading a set of viewing permissions associated with the virtual asset. The set of viewing permissions may comprise a set of one or more identifiers identifying one or more users permitted to view the virtual asset.

Operation 108 comprises determining whether the user is permitted to view the virtual asset. The determination may be in accordance with the set of identifiers for users permitted to view the virtual asset. In some implementations, the determination that the user is not permitted to view the virtual asset is responsive to the set of identifiers being updated upon passage of a particular period of time. In some implementations, a user may have a ticket to view the virtual asset. The ticket may permit the user to view and/or interact with the virtual asset for a particular amount of time. For example, the ticket is a ticket to enter a museum in the virtual space or to view a particular virtual asset within the museum. In some implementations, an identifier for the user is included in the set of identifiers for users permitted to view the virtual asset upon the user receiving and/or activating the ticket. The identifier may be removed from the set upon passage of the particular amount of time. In some implementations, an alternative representation of the virtual asset may be presented to the user upon removal of the identifier.

Operation 110 comprises providing contextual information for the virtual environment, asset information, and/or a prompt as input to a generative language model. Input may be provided to the generative language model responsive to determining the user is not permitted to view the virtual asset. The contextual information may characterize the current state of the range of the virtual environment. The contextual information may comprise one or more of a chat message, a position of an avatar associated with the user, a representation of the field of view depicting the virtual asset, information characterizing interactions of the avatar within the virtual environment, a feature of an avatar possessing the virtual asset, and/or other information. By way of non-limiting, the interactions of the avatar with the virtual environment comprises an action done by the avatar within the virtual environment.

The asset information may characterize the virtual asset. By way of non-limiting example, the asset information characterizes a type of the virtual asset. The type of the virtual asset may be a building, a structure, a vehicle, a wearable, a gadget, and/or another type of entity. By way of non-limiting example, a wearable may be clothing, an accessory, a hairstyle, a skin, and/or another wearable entity. In some implementations, wearables and gadgets must be carried by an avatar and/or another three-dimensional model. In some implementations, buildings, structures, and vehicles do not have to be carried by an avatar and/or another three-dimensional model. The generative language model may be a machine learning model pre-trained and/or finetuned based on the virtual environment. In various embodiments, the one or more machine learning models, described herein, may be additionally trained through manual curation of previously generated outputs. By way of non-limiting example, the generative language model is a large language model. In some implementations, the generative language model is a large language model for generating or masking three-dimensional models. For example, the generative language model is GET3D, 3dFy, and/or another model configured to generate three-dimensional models.

In various embodiments, a vector of features that includes the machine learning model input(s) may be provided to one or more of the machine learning models described herein. Based on the input features, one or more of the machine learning models described herein may generate one or more outputs. In some embodiments, the output(s) of the one or more machine learning models described herein may be a vector of features.

Operation 110 may further comprise determining a form of the alternative representation. The form of the alternative representation may be the alternative representation replacing the virtual asset with a different virtual asset within the field of view, removing the virtual asset from the field of view, and/or modifying the field of view in another way.

In some implementations, the form is determined in accordance with the type of the virtual asset. In some implementations, virtual assets that must be carried may be replaced by another virtual asset in the alternative representation. For example, a designer shirt must be carried or worn by an avatar or another three-dimensional model. The designer shirt may be replaced by a generic shirt in the alternative representation. In some implementations, virtual assets that do not need to be carried may be replaced by another virtual asset or removed from the field of view. For example, a building is not carried within the virtual space. The building may be removed from view in the alternative representation. The user's avatar may not be able to be within a particular range of the building responsive to the building being removed from view.

In some implementations, the form is selected by the owner of the virtual asset. In some implementations, the form is determined based on whether the user will need to interact with the virtual asset. For example, sunglasses are removed from the owner's avatar if the user is only walking by the owner's avatar. For example, sunglasses are replaced with another form of eyewear on the owner's avatar if the user is interacting with the user's avatar.

Operation 110 may further comprise generating the prompt based on the form of the alternative representation. The prompt may be a natural language prompt. The prompt may indicate a task for the generative language model to complete. For example, the prompt instructs the generative language model to generate the alternative representation such that the form of the alternative representation is satisfied.

Operation 112 comprises reading an alternative representation of the field of view generated by the generative language model. The alternative representation may be generated in accordance with the contextual information, the asset information, the prompt, and/or other information. By way of non-limiting example, the alternative representation does not depict the virtual asset. The alternative representation may be generated such that actions of avatars within the field of view are not altered. For example, the virtual asset is a gold hammer that is being held by an owner's avatar. The alternative representation may depict the owner's avatar holding a silver hammer in place of the virtual asset. For example, the silver hammer has a lower real-world value than the gold hammer. As such, the actions of the owner's avatar are not altered and the virtual asset is obfuscated. The alternative representation may be generated such that continuity of the field of view with the virtual environment is maintained. For example, continuity of the field of view is not maintained if the field of view depicts a group of avatars with weapons, but the alternative representation depicts an avatar holding a stuffed animal in place of the weapon.

Operation 114 comprises presenting the alternative representation to the user via the client computing platform. The user may view the alternative representation through a user interface of the client computing platform.

Referring now to FIG. 3A, an exemplary representation of a virtual environment 300 is shown, in accordance with one or embodiments of the present disclosure. Field of view 308 may be the field of view of user 302 within the virtual environment 300. A second user 304 and sunglasses 306 may be visible within field of view 302. Second user 304 may own sunglasses 306 within the virtual environment. By way of non-limiting example, user 302 is permitted to view sunglasses 306. As such, user 302 may view sunglasses 306 within the virtual environment as shown here.

Figure 3B:

FIG. 3B is an exemplary representation of a virtual environment 310, in accordance with one or more embodiments of the present disclosure. Field of view 318 may be an alternative representation of field of view 308 depicted in FIG. 3A. Second user 314 may be the same as second user 304 depicted in FIG. 3A. User 312 may be the same as user 302 in FIG. 3B. Alternatively, user 312 may be a different user. User 312 may not be permitted to view sunglasses 306 depicted in FIG. 3A. Permissions for sunglasses 306 may indicate that an alternative representation should remove sunglasses 306 completely from view of user 312. As such, field of view 318 does not depict another virtual asset in place of sunglasses 306.

Figure 3C:

FIG. 3C is an exemplary representation of a virtual environment 320, in accordance with one or more embodiments of the present disclosure. Field of view 328 may be an alternative representation of field of view 308 depicted in FIG. 3A. Second user 324 may be the same as second user 304 depicted in FIG. 3A. User 322 may be the same as user 302 in FIG. 3B. Alternatively, user 322 may be a different user. User 322 may not be permitted to view sunglasses 306 depicted in FIG. 3A. Permissions for sunglasses 306 may indicate that an alternative representation should replace sunglasses 306 with another virtual asset in all fields of view of user 312 (including at least field of view 328). As such, field of view 328 depicts glasses 326 in place of sunglasses 306.

FIG. 2 is a flowchart illustrating an exemplary method 200 for selectively masking virtual assets in a virtual environment according to one or more exemplary embodiments of the present disclosure. The operations of method 200 presented below are intended to be illustrative. In some implementations, method 200 is accomplished with one or more additional operations not described and/or without one or more of the operations discussed. Additionally, the order in which the operations of method 200 are illustrated in FIG. 2 and described below is not intended to be limiting.

In some implementations, method 200 is implemented in one or more processing devices (e.g., a digital processor, an analog processor, a digital circuit designed to process information, a state machine, and/or other mechanisms for electronically processing information). The one or more processing devices may include one or more devices configured through hardware, firmware, and/or software to be specifically designed for execution of one or more of the operations of method 200.

Operation 202 may be the same as or similar to operation 110 of FIG. 1. Operation 204 comprises reading an alternative representation of a virtual asset. In some implementations, the alternative representation comprises a three-dimensional model of an alternative virtual asset. In some implementations, the alternative representation comprises a modified field of view of the virtual environment. In some implementations, a plurality of alternative representations are generated by the generative language model. In such implementations, Operation 204 comprises reading the plurality of alternative representations. Operation 204 may be the same as or similar to operation 112 of FIG. 1.

Operation 206 may be the same as or similar to operation 102 of FIG. 1. Operation 208 may be the same as or similar to operation 104 of FIG. 1. Operation 210 may be the same as or similar to operation 106 of FIG. 1. Operation 212 may be the same as or similar to operation 108 of FIG. 1. In some implementations, operation 214 comprises selecting one of the plurality of alternative representations to present to the user. By way of non-limiting example, the one of the plurality of alternative representations is selected based on the user. Operation 214 comprises presenting the alternative representation to the user via a client computing platform. Operation 214 may be the same as or similar to operation 114 of FIG. 1.

Operation 202 and/or operation 204 may be performed at any time prior to operation 206 being performed. By virtue of alternative representation being generated and/or read prior to receipt of the request, the alternative representation of a virtual environment may be presented to the user with greater efficiency.

Figure 4:
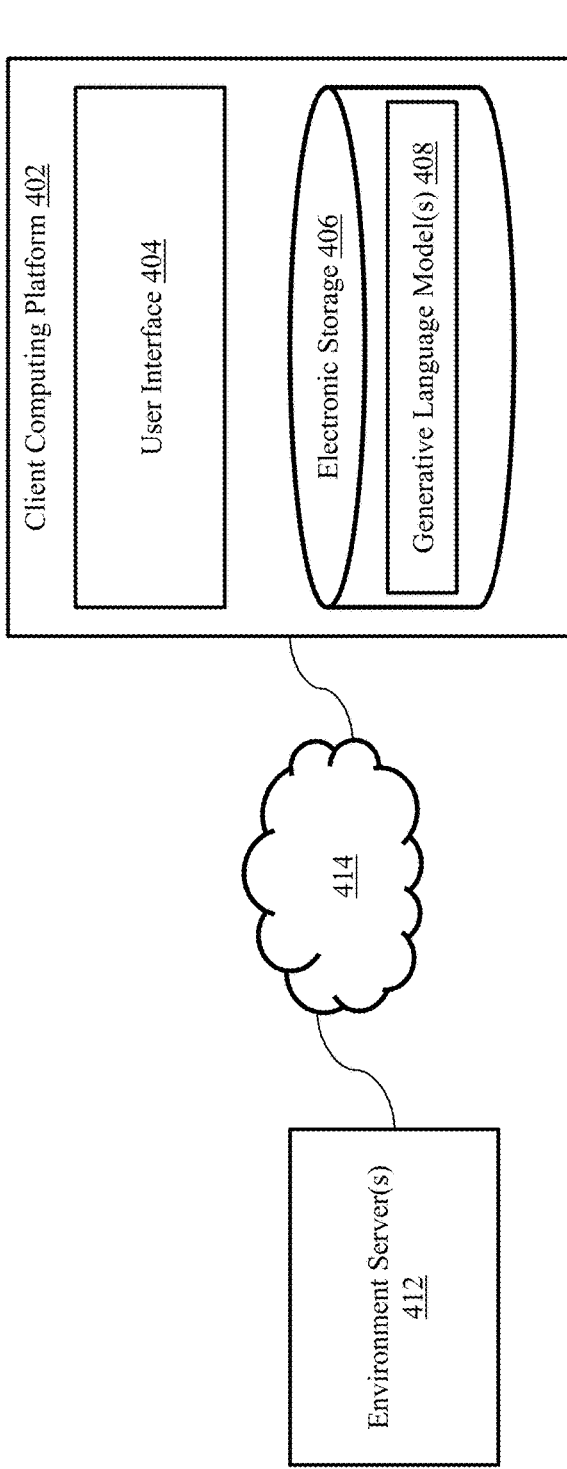
FIG. 4 is a block diagram depicting an exemplary system for selectively masking virtual assets in a virtual environment, in accordance with one or more embodiments of this disclosure.

Referring now to FIG. 4, a block diagram of an exemplary system 400 for selectively masking virtual assets in a virtual environment in accordance with one or more embodiments of this disclosure is shown. One or more environment servers 412 may host and/or manage the virtual environment. By way of non-limiting example, the operations of method 100 shown in FIG. 1 are performed by one or more host servers 412. By way of non-limiting example, the operations of method 200 shown in FIG. 2 are performed by one or more host servers 412. One or more host server 412 may be connected to client computing platform 402 via a network 414. A user may access the virtual environment via client computing platform 402. Client computing platform 402 may comprise user interface 404, non-transitory electronic storage 406, and/or another component. The user may view portions of the virtual environment via user interface 404.

Non-transitory electronic storage 406 may comprise one or more generative language models 408 and/or other information. Environment server(s) 412 may be configured to determine whether client computing platform can run a generative language model. Environment server(s) 412 may be configured to determine whether non-transitory electronic storage 406 comprises one or more generative language models 408. Environment server(s) 412 may be configured to determine whether at least one generative language model 408 is available for generating an alternative representation of a virtual asset. The at least one generative language model 408 may generate the alternative representation responsive to environment server(s) 412 determining the at least one generative language model 408 is available.

Environment server(s) 412 may be configured to upload a generative language model to client computing platform 402 responsive to determining no generative language models are available on client computing platform 402. The uploaded generative language model may be downloaded and stored in non-transitory electronic storage 406. A generative language model remote to client computing platform 402 may generate the alternative representation. The uploaded generative language model may be the same as a generative language model generating the alternative representation remotely and/or may be a smaller pre-trained model. Generating the alternative representation locally to client computing platform 402 (e.g., using one or more generative language models 408) reduces bandwidth requirements and restricts the amount of personal data transferred to environment server(s) 412.

Figure 5:
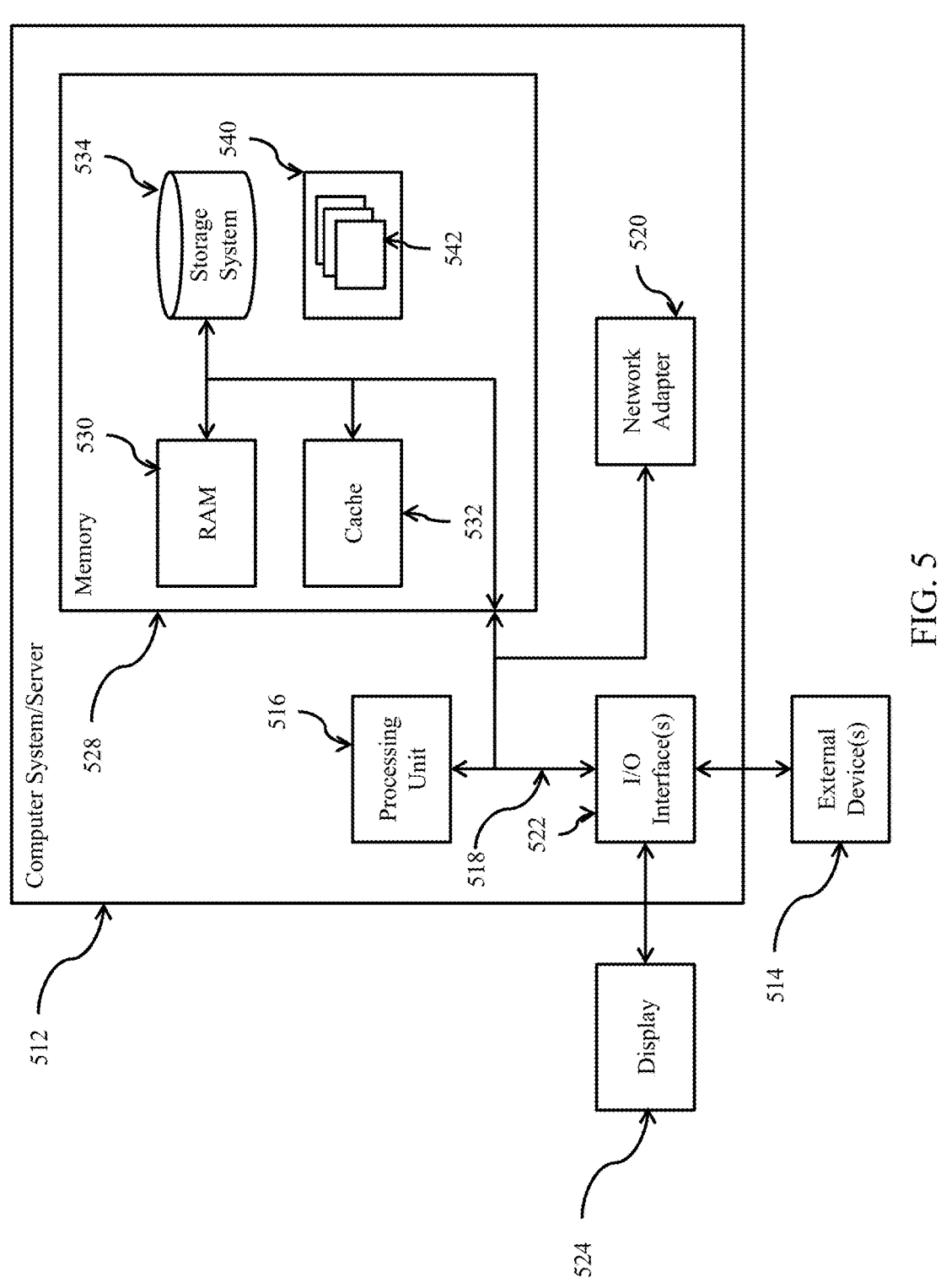
FIG. 5 is a schematic diagram of a computing node, in accordance with one or more embodiments of the present disclosure.

Referring now to FIG. 5, a schematic of an example of a computing node is shown. Computing node 510 is only one example of a suitable computing node and is not intended to suggest any limitation as to the scope of use or functionality of embodiments described herein. Regardless, computing node 510 is capable of being implemented and/or performing any of the functionality set forth hereinabove.

In computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 512 typically includes a variety of computer system readable media. Such media may be any available media that is accessible by computer system/server 412, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the disclosure.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In various embodiments, the one or more machine learning models, described herein, may be and/or may include a dynamic programming algorithm and/or model, such as a dynamic linear programming algorithm/model or a dynamic nonlinear programming algorithm/model. In various embodiments, the one or more machine learning models, described herein, may be a trained classifier. In various embodiments, the trained classifier may be a random decision forest. However, it will be appreciated that a variety of other classifiers are suitable for use according to the present disclosure, including linear classifiers, support vector machines (SVM), or artificial neural network models, such as generative adversarial networks (GANs) and/or recurrent neural networks (RNNs).

Suitable artificial neural network models include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network. In various embodiments, the one or more machine learning models described herein may be trained using data as described herein and/or data available from public and/or private databases and/or data stores.

Reference has been made in detail herein to the exemplary embodiments of the present disclosure, examples of which are illustrated in the accompanying drawings. The systems, devices, and methods disclosed herein are described in detail by way of examples, and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

For any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selectively masking virtual assets in a virtual environment, the computer-implemented method comprising:

receiving a request to present, via a client computing platform associated with a user, a field of view within a range of a virtual environment;

identifying a virtual asset within the range;

reading a set of viewing permissions associated with the virtual asset, wherein the set of viewing permissions comprises a set of one or more identifiers for one or more users permitted to view the virtual asset;

determining, in accordance with the set of identifiers, the user is not permitted to view the virtual asset;

providing contextual information for the virtual environment and asset information as input to a generative language model, wherein the contextual information characterizes a current state of the range of the virtual environment, wherein the asset information characterizes a type of the virtual asset;

determining, in accordance with the type of the virtual asset, a form of an alternative representation, wherein the form of the alternative representation indicates whether the alternative representation replaces the virtual asset with a different virtual asset within the field of view or removes the virtual asset from the field of view;

generating a natural language prompt based on the form of the alternative representation;

providing the natural language prompt as input to the generative language model;

reading the alternative representation of the field of view generated by the generative language model in accordance with the contextual information and the asset information, wherein the alternative representation does not depict the virtual asset; and presenting the alternative representation to the user via the client computing platform.

2. The computer-implemented method of claim 1, wherein the client computing platform is a virtual or augmented reality system.

3. The computer-implemented method of claim 1, wherein the contextual information comprises at least one of a chat message between users of the virtual environment, a position of an avatar associated with the user, a representation of the field of view depicting the virtual asset, and information characterizing an action done by the avatar within the virtual environment.

4. The computer-implemented method of claim 1, wherein the request is received responsive to a field of view of an avatar associated with the user changing.

5. The computer-implemented method of claim 1, the computer-implemented method further comprising:

determining whether the client computing platform comprises the generative language model; and determining whether the generative language model is available for generating the alternative representation of the virtual asset.

6. The computer-implemented method of claim 1, wherein the alternative representation is read prior to receipt of the request.

7. The computer-implemented method of claim 1, wherein the type of the virtual asset is selected from the group consisting of a building, a vehicle, a wearable, or an object.

8. The computer-implemented method of claim 1, wherein the determination that the user is not permitted to view the virtual asset is responsive to the set of identifiers being updated upon passage of a particular period of time.

9. A computer program product for selectively masking virtual assets in a virtual environment, the computer program product comprising:

a set of one or more non-transitory computer-readable storage media; and program instructions, collectively stored in the set of one or more computer-readable storage media for causing a processor set to perform the following computer operations:

receive a request to present, via a client computing platform associated with a user, a field of view within a range of a virtual environment;

identify a virtual asset within the range;

read a set of viewing permissions associated with the virtual asset, wherein the set of viewing permissions comprises a set of one or more identifiers for one or more users permitted to view the virtual asset;

determine, in accordance with the set of identifiers, the user is not permitted to view the virtual asset;

provide contextual information for the virtual environment and asset information as input to a generative language model, wherein the contextual information characterizes a current state of the range of the virtual environment, wherein the asset information characterizes a type of the virtual asset;

determining, in accordance with the type of the virtual asset, a form of an alternative representation, wherein the form of the alternative representation indicates whether the alternative representation replaces the virtual asset with a different virtual asset within the field of view or removes the virtual asset from the field of view;

generating a natural language prompt based on the form of the alternative representation;

providing the natural language prompt as input to the generative language model;

read the alternative representation of the field of view generated by the generative language model in accordance with the contextual information and the asset information, wherein the alternative representation does not depict the virtual asset; and present the alternative representation to the user via the client computing platform.

10. The computer program product of claim 9, wherein the request is received responsive to a field of view of an avatar associated with the user changing.

11. The computer program product of claim 9, the computer operations further comprising:

determine whether the client computing platform comprises the generative language model; and determine whether the generative language model is available for generating the alternative representation of the virtual asset.

12. The computer program product of claim 9, wherein the alternative representation is read prior to receipt of the request.

13. A computer system for selectively masking virtual assets in a virtual environment, the computer system comprising:

US 12,699,796 B2

15 a processor set;

a set of one or more non-transitory computer-readable storage media; and program instructions, collectively stored in the set of one or more non-transitory computer-readable storage media for causing the processor set to perform the following computer operations:

receive a request to present, via a client computing platform associated with a user, a field of view within a range of a virtual environment;

identify a virtual asset within the range;

read a set of viewing permissions associated with the virtual asset, wherein the set of viewing permissions comprises a set of one or more identifiers for one or more users permitted to view the virtual asset;

determine, in accordance with the set of identifiers, the user is not permitted to view the virtual asset;

provide contextual information for the virtual environment and asset information as input to a generative language model, wherein the contextual information characterizes a current state of the range of the virtual environment, wherein the asset information characterizes a type of the virtual asset;

determining, in accordance with the type of the virtual asset, a form of the alternative representation, wherein the form of the alternative representation indicates whether the alternative representation replaces the virtual asset with a different virtual asset within the field of view or removes the virtual asset from the field of view;

generating a natural language prompt based on the form of the alternative representation;

providing the natural language prompt as input to the generative language model;

read the alternative representation of the field of view generated by the generative language model in accordance with the contextual information and the asset information, wherein the alternative representation does not depict the virtual asset; and present the alternative representation to the user via the client computing platform.

14. The computer system of claim 13, wherein the request is received responsive to a field of view of an avatar associated with the user changing.

15. The computer system of claim 13, the computer operations further comprising:

determine whether the client computing platform comprises the generative language model; and determine whether the generative language model is available for generating the alternative representation of the virtual asset.

16. The computer system of claim 13, wherein the alternative representation is read prior to receipt of the request.

\* \* \* \* \*